Oct. 5, 1943.   E. E. RUSH   2,331,234
STRAINER FUNNEL
Filed Nov. 24, 1939
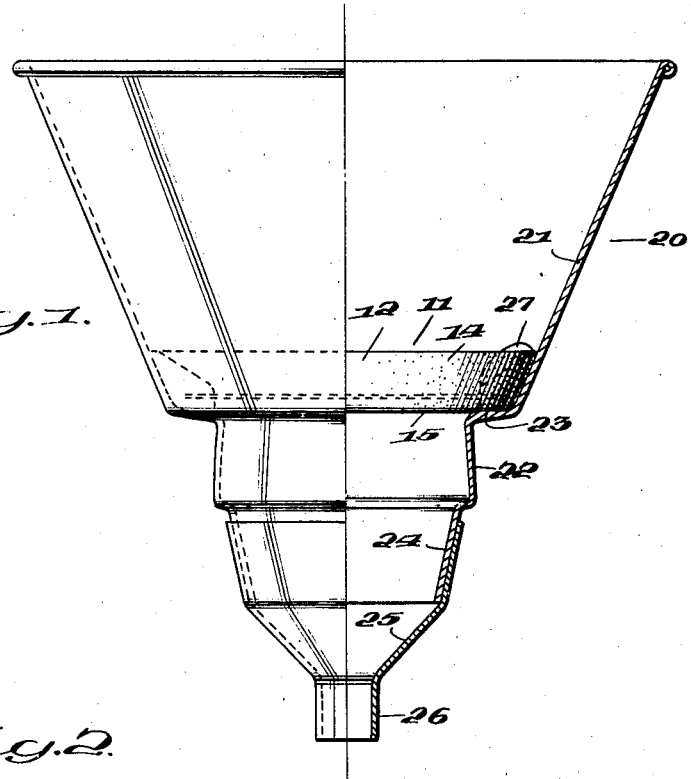
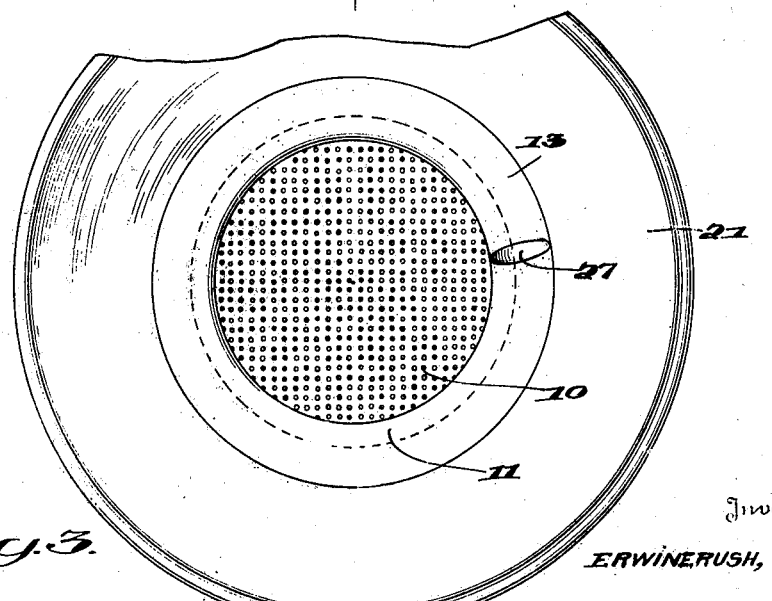
Inventor
E. RWIN E. RUSH, Patented Oct. 5, 1943

2,331,234

UNITED STATES PATENT OFFICE 2,331,234

STRAINER FUNNEL

Erwin E. Rush, Indianapolis, Ind.

Application November 24, 1939, Serial No. 305,987

3 Claims. (Cl. 210—158)

This invention is directed to an improved funnel construction and is particularly concerned with an improved funnel strainer. The proposed strainer is capable of use in numerous types of funnels but is preferably employed with an improved form of funnel specially designed for use therewith and forming a part of the invention. Both the strainer and funnel are so constituted as to be readily cleaned and provide for sanitary usage, and will be found especially useful in the preparation of baby food and for various hospital purposes.

Straining funnels have been known for many years but so far as I am aware all of the prior constructions are so constituted as to be difficult to clean and unsanitary. Consequently, they have never been used extensively in connection with the preparation of food and other materials where sanitation is important. It is, therefore, common practice at the present time to hold any common form over the mouth of a funnel while material is poured therethrough. Even under these conditions there is no assurance of sanitary conditions since conventional types of strainers such as used in the kitchen are so made as to be difficult to clean. The invention can be made very cheaply and as hereafter will become apparent is so simple that it completely overcomes the objections of prior constructions.

In the drawing I have illustrated my improved funnel strainer and improved funnel particularly adapted for use therewith. In such drawing:

Figure 1 is a view of the improved funnel with a portion of the wall broken away to show the novel strainer installed therein;

Figure 2 is a top plan view corresponding to Figure 1; and

Figure 3 is a cross-section of the funnel strainer.

The funnel strainer includes a strainer member 10 preferably in the form of a flat disc, and surrounding and embedding the edge thereof is an annular body 11 of rubber or other suitable resilient material which will present a smooth surface easy to clean. Such body is of greater diameter at one end than the other and is provided with a beveled, or inclined, outer peripheral face 12 adapted to make sealing engagement with the inner wall of a funnel. As will be observed in Figure 3 the body is of greater thickness adjacent the end thereof of smallest outside diameter, and the edge of the strainer member 10 is embedded in this portion of the body. Preferably the body is made with a cross-section approximating an obtuse-angled triangle, and such form will provide the body with an inner peripheral face 13 inclining outwardly from the upper side of the strainer member and meeting, or substantially so, the outer peripheral wall 12 at the end of the body of largest diameter. Thus, a tapering lip 14 will be provided which will enable the body to more readily compress in a radial direction and insure a sealing fit between the outer face 12 of the body and the wall of the funnel under conditions where the inclination of the funnel wall does not conform to the inclination of the body face. The inclined inner peripheral face 13 of the annular body will direct materials in the marginal area of a funnel inwardly so as to insure passage thereof through, or at least to, the strainer member 10. Solid materials do not therefore tend to accumulate on the annular body as might be the case if it were provided with a flat horizontal end wall at the end facing the top of a funnel.

The end of the annular body of smaller diameter is preferably provided with a radially extending flat face 15 adapted to engage a retaining seat which may be provided in a funnel for this purpose. In such an arrangement both the end wall 15 and the inclined outer peripheral wall 12 will perform a sealing function, as will hereafter become more apparent.

The annular body is molded around and vulcanized to the strainer member 10. While woven wire fabric is frequently used for strainers a superior product according to the present invention may be made by utilizing a perforate disc of sheet material, ordinarily metal. When molding rubber or other plastic to wire gauze, material tends to flow along the surfaces of the gauze so as to clog the openings in the gauze over an area inwardly of the inner margin of the annular body. By using a perforate sheet material the molding of the annular body around the edge may be accomplished without any tendency of the rubber to flow, and a clean neat edge may be secured where the interior of the annular body meets the disc.

In Figures 1 and 2 I have shown an improved form of funnel 20 formed of seamless sheet metal, and preferably chromium plated. The same may be produced by stamping. As conventional, the funnel will have an inclined inner peripheral wall 21 with which the outer wall of the annular body 11 surrounding the strainer member will engage. Preferably, the funnel in its lower area is abruptly decreased in diameter to provide a reduced portion 22. An inturned flange 23 is formed at the point of change in diameter which serves as a seat for supporting the annular body of the strainer member. Preferably, flange 23 will extend substantially radially so as to make sealing engagement with the end face 15 of the annular body. An extension 24 of the reduced portion 22 of the funnel is preferably tapered in form so as to enable the insertion thereof in utensils having a large mouth. In many cases it will be found that flange 23 will form a seat for supporting the funnel on the mouth rim of the utensil. A detachable nipple member 25 may be provided where desired. Such device will telescopically engage portion 24 of the funnel, and will be provided with a small end portion 26 which may be inserted in the mouth of baby bottles or other utensils having a small mouth.

It will be evident that the funnel here described will be extremely sanitary and easy to clean, particularly since no crevices or sharp corners are present.

The removable strainer will occupy a position in the funnel as shown in Figure 1, and it will be evident from the broken away portion of such view that the annular body surrounding the strainer member so engages the funnel as to prevent leakage of liquid around the body. As will be further apparent from Figure 2 taken in connection with Figure 3, the form of the annular body is such as to leave no crevices or abrupt surfaces on which material poured into the funnel will collect. As previously mentioned, the inclined inner peripheral face 13 of the annular body will guide materials in the marginal area of the funnel inwardly towards the strainer member 10.

While the strainer member with its surrounding annular sealing and supporting body is primarily intended for use with funnels, it will be evident that the shape of the body is such that it may be used elsewhere than in a funnel. For example, it may be plugged into the drain opening of a kitchen sink.

The strainer may be made of various diameters, and strainer discs having any desired size and spacing of perforations may be employed. To facilitate ready removal of the strainer from a funnel or elsewhere, a handle member 27 may be secured to the annular body 11 at the upper side of the strainer member 10 at or adjacent the end of the body of larger diameter. As shown, member 29 is molded integrally with the inclined inner peripheral face 13 of the body, and such arrangement is desirable as it does not interfere with ready cleaning of the strainer.

The construction herein shown and described is merely illustrative both as regards the strainer and the funnel. The invention is capable of some modification and equivalency and the scope of the invention is therefore to be determined according to the scope of the appended claims.

I claim:

1. A funnel strainer comprising a resilient annular body having an inclined outer peripheral face and a flat end at the end of the body of smaller diameter, a strainer member surrounded by and embedded in the annular body near the flat end face, and an inclined inner peripheral face on said body extending outwardly from adjacent one side of the strainer member and meeting the outer peripheral face at the end of the body of larger diameter opposite to the flat end face.

2. A funnel strainer comprising a strainer disc of perforated sheet material, and a surrounding annular body embedding and being molded to the edge of the disc, said annular body being of a cross-sectional form substantiating an obtuse-angled triangle and including an end face and an outer peripheral face inclined at an obtuse angle to said end face, the edge of the strainer disc being embedded in the radially thicker portion of the annular body adjacent said end face.

3. A straining funnel comprising a funnel member having an inclined inner peripheral wall and having an inwardly projecting flange, and a detachable strainer in said funnel comprising a resilient annular body and a strainer disc having its edge surrounded by and embedded in said resilient annular body, said annular body having an inclined outer peripheral face yieldingly and frictionally engaging the inner peripheral wall of the funnel with a sealing fit above said flange and having an end face seating against and making yielding sealing engagement with, said flange.

ERWIN E. RUSH.